United States Patent
Fukazawa et al.

(10) Patent No.: US 9,793,549 B2
(45) Date of Patent: Oct. 17, 2017

(54) CATALYST-SUPPORTING SUBSTRATE, METHOD OF MANUFACTURING THE SAME, MEMBRANE ELECTRODE ASSEMBLY, AND FUEL CELL

(71) Applicants: Taishi Fukazawa, Tokyo (JP); Wu Mei, Yokohama (JP); Yoshihiro Akasaka, Kawasaki (JP); Norihiro Yoshinaga, Kawasaki (JP)

(72) Inventors: Taishi Fukazawa, Tokyo (JP); Wu Mei, Yokohama (JP); Yoshihiro Akasaka, Kawasaki (JP); Norihiro Yoshinaga, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 299 days.

(21) Appl. No.: 13/626,293

(22) Filed: Sep. 25, 2012

(65) Prior Publication Data
US 2013/0078549 A1    Mar. 28, 2013

(30) Foreign Application Priority Data
Sep. 26, 2011   (JP) .................. 2011-209858

(51) Int. Cl.
*H01M 4/86* (2006.01)
*H01M 4/88* (2006.01)
(Continued)

(52) U.S. Cl.
CPC ....... *H01M 4/8605* (2013.01); *H01M 4/8867* (2013.01); *H01M 4/8871* (2013.01);
(Continued)

(58) Field of Classification Search
CPC ............ H01M 4/8605; H01M 4/8621; H01M 4/8846; H01M 4/9041; H01M 4/9058;
(Continued)

(56) References Cited

U.S. PATENT DOCUMENTS 5,672,438 A * 9/1997 Banerjee ................ C08J 5/2237
                                                                    429/494
8,128,986 B2    3/2012 Mei et al.
(Continued)

FOREIGN PATENT DOCUMENTS

CN          1964111 A        5/2007
JP       2001-307751        11/2001
(Continued)

OTHER PUBLICATIONS

English Machine Translation of Wang et al. CN1964111, May 2007.*
(Continued)

*Primary Examiner* — Lisa S Park
(74) *Attorney, Agent, or Firm* — Oblon, McClelland, Maier & Neustadt, L.L.P.

(57) ABSTRACT

According to one embodiment, a catalyst-supporting substrate comprises a substrate and a catalyst layer including a plurality of pores, the catalyst layer being supported on the substrate. The average diameter of the section of the pore when the catalyst is cut in the thickness direction of the thickness is 5 nm to 400 nm, and the long-side to short-side ratio of the pore on the section is 1:1 to 10:1 in average.

5 Claims, 5 Drawing Sheets

(51) Int. Cl.
*H01M 4/90* (2006.01)
*H01M 4/92* (2006.01)
*H01M 8/1018* (2016.01)

(52) U.S. Cl.
CPC ....... *H01M 4/9016* (2013.01); *H01M 4/9041* (2013.01); *H01M 4/92* (2013.01); *H01M 2008/1095* (2013.01)

(58) Field of Classification Search
CPC ............ H01M 4/9075; H01M 4/8867; H01M 4/8871; H01M 4/92; H01M 4/9016; H01M 2008/1095
USPC .......................................... 429/482; 502/300
See application file for complete search history.

(56) References Cited

U.S. PATENT DOCUMENTS

| | | | |
|---|---|---|---|
| 2001/0041277 A1 | 11/2001 | Chang | |
| 2003/0082431 A1* | 5/2003 | Klitsner | H01M 4/8605 429/434 |
| 2006/0189132 A1 | 8/2006 | Iwabuchi et al. | |
| 2007/0099066 A1* | 5/2007 | Okumura | H01M 4/8814 429/482 |
| 2008/0230171 A1* | 9/2008 | Mei et al. | 156/150 |
| 2008/0233465 A1 | 9/2008 | Mizutani et al. | |
| 2008/0241604 A1* | 10/2008 | Moore | H01M 4/8605 429/424 |
| 2008/0292942 A1 | 11/2008 | You et al. | |
| 2010/0021787 A1 | 1/2010 | Wu et al. | |
| 2010/0239950 A1 | 9/2010 | Mei et al. | |

FOREIGN PATENT DOCUMENTS

| | | |
|---|---|---|
| JP | 2003-109606 | 4/2003 |
| JP | 2006-147371 | 6/2006 |
| JP | 2008-229514 | 10/2008 |
| JP | 2008-262903 | 10/2008 |
| JP | 2010-33759 | 2/2010 |

OTHER PUBLICATIONS

Office Action and Search Report issued on Jul. 1, 2014 in the corresponding Chinese Patent Application No. 201210317299.4 (with English Translation).
Japanese Office Action issued Jul. 29, 2014, in Japan Patent Application No. 2011-209858 (with English translation).
Office Action issued Oct. 9, 2014, in corresponding Japanese Patent Application No. 2011-209858 (with English-language Translation).
Office Action mailed on Oct. 6, 2015, in corresponding Japanese application No. 2014-261113, with EnglishTranslation.
Office Action dated Apr. 5, 2016 in Japanese Patent Application No. 2014-261113, filed Dec. 14, 2014.
U.S. Appl. No. 13/421,662, filed Mar. 15, 2012, Wu Mei.
U.S. Appl. No. 12/726,638, filed Mar. 18, 2010, 2010/0239950 A1, Sep. 2010, Wu Mei, et al.
U.S. Appl. No. 12/508,954, filed Jul. 24, 2009, 2010/0021787 A1, Jan. 2010, Wu Mei, et al.

* cited by examiner

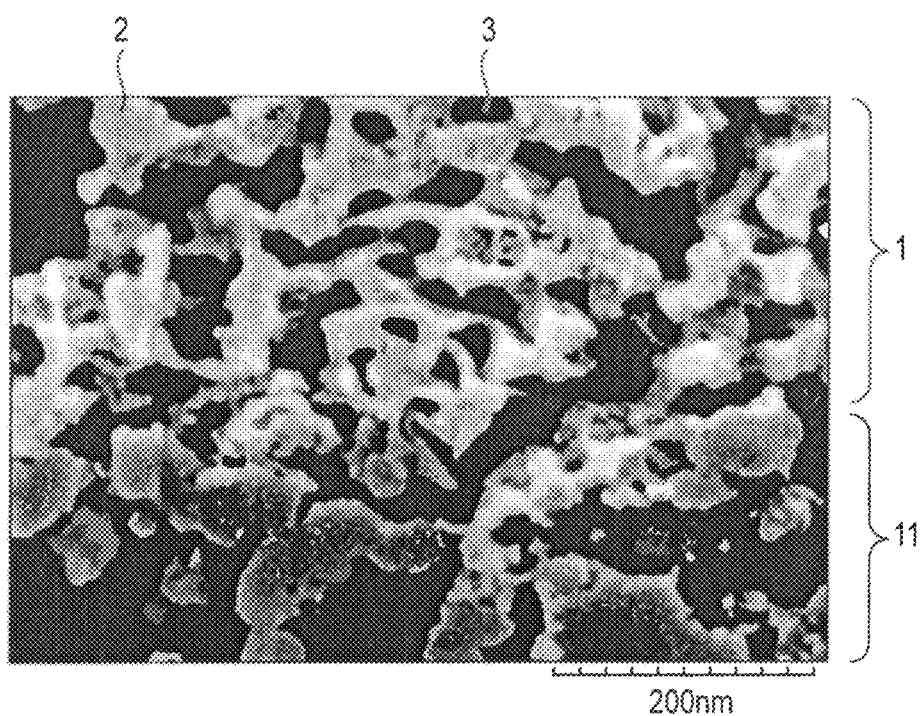
F I G. 1

CATALYST-SUPPORTING SUBSTRATE, METHOD OF MANUFACTURING THE SAME, MEMBRANE ELECTRODE ASSEMBLY, AND FUEL CELL

CROSS-REFERENCE TO RELATED APPLICATIONS

This application is based upon and claims the benefit of priority from Japanese Patent Application No. 2011-209858, filed Sep. 26, 2011, the entire contents of which are incorporated herein by reference.

FIELD

Embodiments described herein relate generally to a catalyst-supporting substrate, a method of manufacturing the catalyst-supporting substrate, a membrane electrode assembly, and a fuel cell.

BACKGROUND

In the electrode catalyst of conventional polymer electrolyte fuel cells (PEFC), the quantity of platinum to be used is about 1 g Pt/kW for fuel cell vehicles and 5 to 8 g Pt/kW for stationary use. This implies that a cost of hundreds of thousands of yen/vehicle is necessary for a platinum metal of the electrode catalyst of FCV in consideration of the present commercial price of platinum. The present target concerning the quantity of platinum to be used in FCV is to reduce the quantity of platinum to about 1/10 that used at present, that is, about 0.1 g/kW for vehicles and about 1 g/kW for stationary use by the time FCVs initially spread which is expected in 2015 to 2020. This needs a further improvement in mass activity (A/g), that is, the amount of current which can be extracted from platinum per unit mass.

Further, when a carbon-supported catalyst is used as the catalyst used in FCV, the carbon support of the carbon-supported catalyst is severely corroded at the start or stop of operations, which promotes the deterioration of the catalyst layer and further the deterioration of the membrane electrode assembly. For this, it is required to improve the catalyst layer to thereby largely improve the durability, and particularly, the durability of the cycle durability.

There is a method for forming the catalyst layer by the sputtering method or vapor deposition method. Such an electrode ensures higher durability as compared with an electrode using a carbon-supported catalyst. Specifically, a platinum catalyst material is deposited on a whisker substrate by sputtering. According to this method, high durability is obtained and also, the amount of platinum to be used can be limited. However, a platinum catalyst block having a size of tens of nanometers is formed in this method, and therefore, this method is inadequate in utilization efficiency of a catalyst material.

Further, there is a method in which a catalyst material mixed with a pore-forming material is used to form a catalyst layer, and then, the pore-forming material is melted to remove it, thereby forming pores in the catalyst layer. Specifically, a mixed layer and a pore-forming material layer constituted of a catalyst material and a pore-forming material are formed by sputtering and then, the pore-forming material in the mixed layer and pore-forming material layer are melted to remove them, thereby forming a laminate structure including a catalyst coagulation layer and a void layer such that high catalyst utilization efficiency is attained. However, this method is unsatisfactory in view of durability or the like.

BRIEF DESCRIPTION OF THE DRAWINGS

FIG. 1 is a microphotograph of a part of a section of a catalyst-supporting substrate according to an embodiment;

DETAILED DESCRIPTION

Figure 2A:
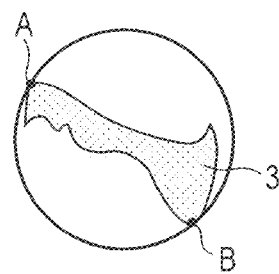
FIGS. 2A, 2B and 2C are views showing an example of a method of measuring the diameter and long-side to short-side ratio of a pore.

In general, according to one embodiment, a catalyst-supporting substrate comprises a substrate and a catalyst layer including a plurality of pores, the catalyst layer being supported on the substrate. The average diameter of the section of the pore when the catalyst is cut in the thickness direction is 5 nm to 400 nm, and the long-side to short-side ratio of the pore on the section is 1:1 to 10:1 in average.

The embodiment will be explained in detail with reference to the drawings.

FIG. 1 is a view showing an image when a part of the section of a catalyst-supporting substrate according to an embodiment is observed by a scanning electron microscope (SEM). As illustrated, the catalyst-supporting substrate is provided with a catalyst layer 1 supported on a substrate 11.

In this catalyst-supporting substrate, the catalyst layer 1 includes a catalyst 2 and a plurality of pores 3 which exist between the catalysts 2 and have different shapes, the catalyst layer having a sponge-like shape. In a conventional catalyst-supporting substrate, on the other hand, the catalyst layer has a structure in which flat pores are plurally overlapped on each other in the thickness direction.

Such a structure of the catalyst-supporting substrate can be easily confirmed by observing the section by using SEM. SEM is a preferable means to confirm the structure of the catalyst layer 1 because the characteristics of the depth of a sample can be grasped more easily by SEM than by a transmission electron microscope (TEM).

The fact that the catalyst-supporting substrate according to the embodiment has the sponge-like shape can be expressed based on the shape of the section of the pore 3 observed when the catalyst layer 1 is cut in the thickness direction. Specifically, the average diameter of the section of the pore 3 when the catalyst 1 is cut in the thickness direction is 5 nm to 400 nm. Further, the long-side to short-side ratio of the pore 3 on the section when the catalyst layer 1 is cut in the thickness direction is 1:1 to 10:1 in average.

The shape of the section of the pore 3 can be determined by taking a sectional photograph, selection of a pore, and measurement of pores in the following manner.

First, the catalyst layer is cut in the thickness direction to obtain a sectional photograph. The cutting can be attained, for example, by the cross section polisher method (CP method) using an argon ion beam enabling broad radiation. This ensures that structural variations caused by the cutting operation can be restrained to the utmost, so that a sectional structure close to that put into its original state can be observed. Because the Ar ion used in the CP method has an energy as low as 2 to 6 kV and is applied to a sample in the state close to parallel to the section, less selective etching is caused even if the sample is made of a composite material and a smooth section having reduced ion damages is therefore obtained. The section is observed at a magnification of, for example, 200000 by using SEM to obtain a sectional photograph. The catalyst layer is preferably cut at almost the center in the direction of the plane thereof.

Next, a pore 3 appropriate for measurement is selected from those in the obtained sectional photograph. Five pores 3 per catalyst layer 1 are optionally selected. When the number of pores 3 selected in one image is less than 5, a sectional photograph obtained by observing a different visual field is used to select. As the pores 3 subjected to measurement, those with boundaries being closed between the pore 3 and the catalyst 2 on the section are selected. Although according to, for example, the sectional photograph of FIG. 1, the structure of a pore positioned deeper than the section can be viewed, such a structure is neglected in the measurement and only the boundary formed on the section is chosen as the subject to measurement. According to the sectional photograph of FIG. 1, although a pore 3 of which the boundary with the catalyst 2 is extended to the outside of the sectional photograph, such a pore 3 is excluded from the subject to measurement.

Figure 2B:
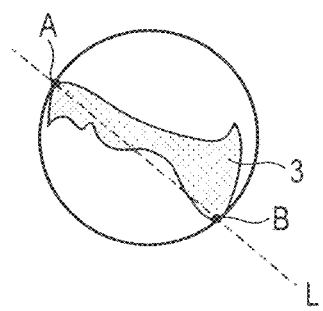
Figure 2C:
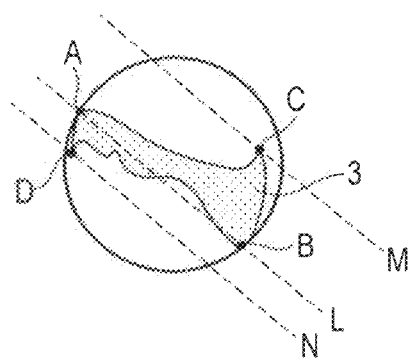

Finally, the diameter and long-side to short-side ratio of the selected pore 3 are respectively measured. FIGS. 2A, 2B and 2C show an example of measurement method of the diameter of and long-side to short-side ratio of the selected pore. First, as shown in FIG. 2A, a smallest circle including the pore 3 is drawn in the sectional photograph. Such a circle comes into contact with the contour of the pore 3 either at two points A and B or at three or more points as shown in FIG. 2A. Here, the aforementioned circle comes into contact with the contour of the pore 3 at two points A and B. Next, as shown in FIG. 2B, a straight line L running through the contact points A and B is drawn. Next as shown in FIG. 2C, among lines parallel to the straight line L, a line that runs on the contour and does not cross the region enclosed by the contour is drawn. In FIG. 2C, a straight line M which comes in contact with the pore 3 at the point C and a straight line N which comes into contact with the pore 3 at the point D are drawn. Here, the distance between the points A and B is defined as <AB> and the distance between the straight lines M and N is defined as <MN>. Then, in the case where the aforementioned circle comes into contact with the contour of the pore 3 at two points A and B, <AB> is defined as the diameter of the pore 3 and as the long-side length of the pore 3, and <MN> is defined as the short-side length of the pore 3. Moreover, the ratio of long-side length/short-side length is calculated from the obtained long-side length and short-side length. Then, with regard to the five measured results obtained from one catalyst layer, an average diameter and an average of the ratios are calculated. Further, when oxides, nitrides or alloys exist in the pore 3, these materials are neglected to calculate the diameter and ratio based only on the boundary between the catalyst 2 and the pore 3.

Figure 3:
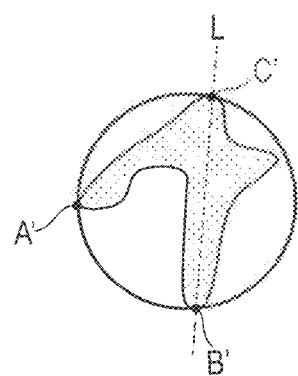
FIG. 3 is a view showing another example of a method of measuring the diameter and long-side to short-side ratio of a pore.

As shown in FIG. 3, when there are three or more contact points between the contour of the pore 3 and the circle, the distances between all contact points are measured and a pair of contact points most distant from each other is selected to draw a straight line L running through these points. For example, the pore 3 shown in FIG. 3 has contact points A', B', and C'. In this case, the distance between the points A' and B', the distance between the points B' and C', and the distance between the points C' and A' are calculated to compare these distances with each other. As a result, a straight line L running through the points B' and C' is drawn because the distance between the points B' and C' is the longest. The subsequent procedures are carried out in the same manner as in the case of FIGS. 2A, 2B and 2C. When <AB> is the same as <MN>, the long-side length to short-side length ratio is regarded as 1:1.

Figure 4:
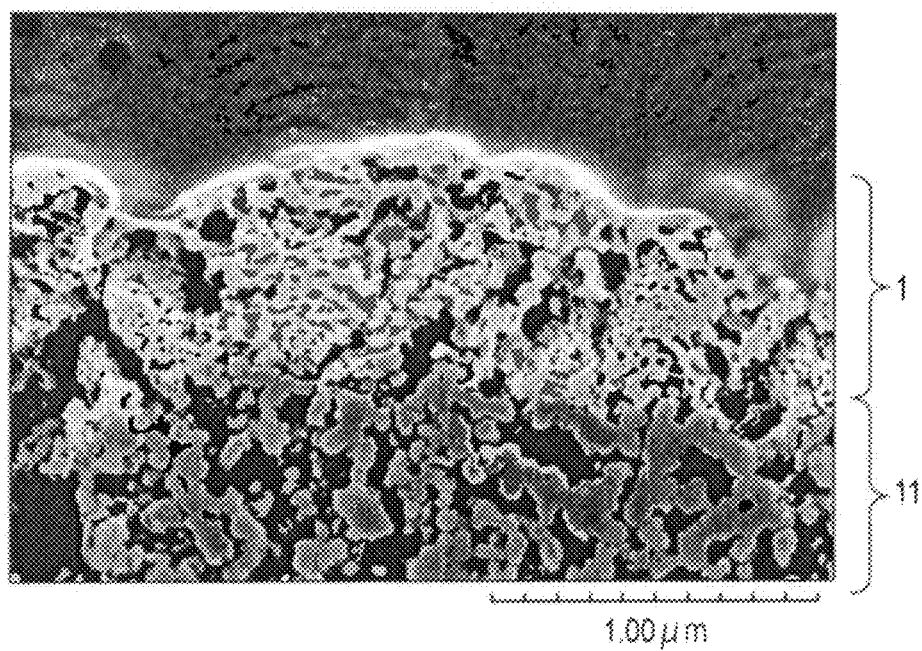
FIG. 4 is a microphotograph of a part of a section of a catalyst-supporting substrate according to an embodiment.

In the catalyst-supporting substrate according to the embodiment, the average thickness of the catalyst layer 1 may be designed to be, for example, 0.05 μm to 3 μm. This average thickness can be found in the following manner. The catalyst layer is cut in the thickness direction by using the CP method. The section was observed at a magnification of 50000 by using SEM to obtain a sectional photograph. FIG. 4 shows the sectional photograph enlarged at a magnification of 50000. The distance from the upper surface of the catalyst layer 1 to the boundary between the substrate 11 and the catalyst layer 1 is measured at any point based on the sectional photograph. This measurement is made at five points and an average of the results of the five points is set to an average thickness of the catalyst layer 1.

As the material of the catalyst layer 1, a known one may be used in the catalyst-supporting substrate according to the embodiment. Particularly, it is desirable to use a material which can attain excellent catalyst activity, conductivity, and stability. The catalyst layer 1 may be a precious metal type catalyst. The precious metal type catalyst is a catalyst containing at least one of precious metal elements such as Pt, Ru, Rh, Os, Ir, Pd, and Au. Particularly, the precious metal type catalyst is preferably alloys of these precious metal elements and other elements, or complex oxides of these precious metal elements. Or, the catalyst layer 1 may be an oxide type catalyst, nitride type catalyst, carbide type catalyst, or the like.

In the catalyst-supporting substrate according to the embodiment, the catalyst layer 1 may be made of a single metal of an element selected from the group consisting of Pt, Ru, Rh, Os, Ir, Pd, Au, Zr, Ti, Ta, Si, Al, Sn, Hf, Ge, Ga, In, Ce, Nb, W, Mo, Cr, Ni, Co, Mn, Cu, Fe, Zn, B, and V, an alloy made of a plurality of elements mentioned above, or an oxide containing at least one of the aforementioned elements.

Further, in the catalyst-supporting substrate according to the embodiment, the catalyst layer 1 may be an aggregate of an amorphous catalyst or crystal catalyst. Further, a particulate catalyst may exist in a certain amount or less in the catalyst layer 1. The catalyst layer 1 may be formed directly on a porous substrate. In this case, however, there is the case where a particulate catalyst is formed. However, if the amount of the particulate catalyst is too large, the effect of the catalyst-supporting substrate according to the embodiment is reduced. Therefore, the abundance of the particulate catalyst is preferably less than 40% based on the catalyst layer 1. Particularly, the abundance of the particulate catalyst is preferably 35% or less and more preferably 30% or less. The abundance of the particulate catalyst can be measured according to the above method of deciding the shape of the pore 3. Specifically, a sectional photograph may be taken to measure the amount of the particulate catalyst from the sectional photograph.

In the catalyst-supporting substrate according to the embodiment, an oxide or nitride containing at least one element selected from the group consisting of Ni, Mn, Sn, Al, Cu, Fe, and Zn may be present inside the pores 3. The oxide and nitride may be particles. Ceramic particles such as these oxides or nitrides preferably have an average particle diameter of 50 nm or less. When the average diameter exceeds 50 nm, the resistance of the catalyst layer 1 is increased and there is therefore the possibility that sufficient cell characteristics are not obtained. A plurality of different oxides may be present inside the pores 3. In addition to the aforementioned oxides, particles of an oxide may be present which can easily introduce solid acidity, for example, an oxide of at least one element selected from the group consisting of Zr, Ti, Ru, Si, Al, Sn, Hf, Ge, Ga, In, Ce, Nb, W, Mo, Cr, B, and V. When the ratio of an oxide element to a metal element constituting the particles in the catalyst-supporting substrate according to the embodiment is 5% or more, the particle is defined as one comprising an oxide.

The presence of an oxide in the pore 3 can be confirmed, for example, as follows. The catalyst layer 1 is cut into a foil by an ultramicrotome to make a thin film having tens of nanometers for TEM observation. TEM observation is made at a magnification of about 600000 to 1000000 to confirm whether or not the catalyst layer 1 and the pore 3 are present and further to confirm whether or not the particles existing in the pore 3 are present. When the particles exist, the particles are identified by mapping using, for example, the energy dispersive x-ray spectroscopy (EDS or EDX) to obtain each spectrum of metal elements and oxygen element.

The catalyst-supporting substrate according to the embodiment has a higher mass activity than conventional catalysts because a plurality of pores 3 is present in the catalyst layer 1, so that the catalyst layer 1 has a so-called sponge-like structure. Generally, the utilization efficiency of a catalyst is known to be proportional to the specific surface area of a catalyst. However, the catalyst layer 1 of the catalyst-supporting substrate according to the embodiment has a higher mass activity though it has a smaller specific surface area than conventional particulate catalysts (for example, nano-catalyst particles having a particle diameter of 2 nm to 5 nm) having the same composition. Although this reason has not been clarified, it is inferred that this is caused by the difference of surface structure which strongly affects the catalyst activity. Specifically, the catalyst layer 1 of the catalyst-supporting substrate according to the embodiment has a surface structure different from that of a conventional catalyst layer. This reason is considered that the proportion of active sites which are present on the surface and each have high activity is larger than that of the conventional catalyst layer.

Further, the presence of an oxide or nitride such as those mentioned above in the pore 3 of the catalyst-supporting substrate according to the embodiment promotes proton conductivity and restrains the coagulation among catalysts and growth of the catalyst, making it possible to produce various effects including improvements in the utilization efficiency and durability of the catalyst, and further, maintenance of the structure of the catalyst layer 1 and promotion of mass transfer such as fuel diffusion. Furthermore, when a plurality of different oxides is present in the pore 3, it is highly possible that a special interface structure is formed between these oxides and therefore the catalyst layer 1 has solid acidity promoting proton conductivity, leading to the formation of a proton conductive path and promotion of an electrode catalyst reaction, thereby making it possible to obtain a higher utilization efficiency and durability of the catalyst material. Further, the proton conductivity can be more improved when an oxide which can easily introduce solid acidity is made to be present in the pore 3.

Figure 5:
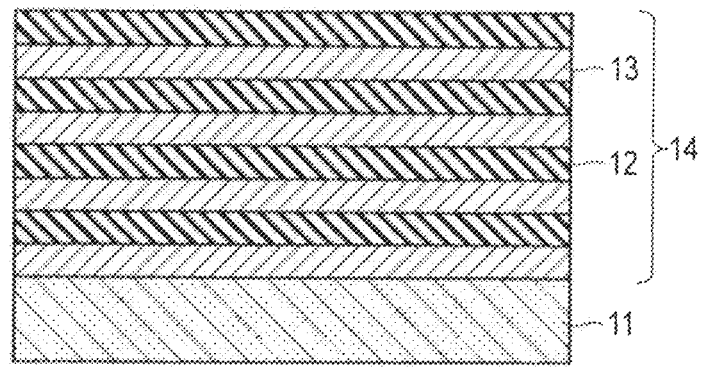
FIG. 5 is a sectional view showing the outline of a step of forming the deposit layer of a catalyst-supporting substrate according to an embodiment.
Figure 6:
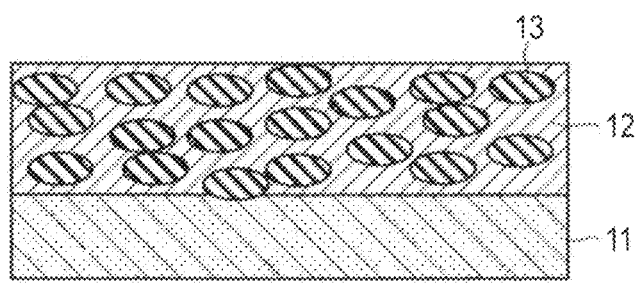
FIG. 6 is a sectional view showing the outline of a step of heat-treating the deposit layer of a catalyst-supporting substrate according to an embodiment.

FIGS. 5 and 6 schematically show a method for producing a catalyst-supporting substrate according to the embodiment.

The method for producing a catalyst-supporting substrate according to an embodiment comprises a step of repeatedly simultaneously or alternately performing sputtering or vapor deposition of a first material having catalyst activity and sputtering or vapor deposition of a second material which is dissolved more easily than the first material in dissolution treatment using an acid solution, alkali solution or electrolytic method, on a substrate to form a deposit layer including the first and second materials, a step of performing heat treatment of the deposit layer to diffuse the second material into the first material, and a step of removing at least a part of the second material from the heat-treated deposit layer by dissolution treatment to obtain a catalyst layer containing a plurality of pores.

Each step will be explained.

FIG. 5 is a sectional view schematically showing a step of forming the deposit layer. In this step, a first material having catalyst activity and a second material which can be dissolved in an acid solution, alkali solution, or by the electrolytic method are deposited alternately on the substrate 11.

As the substrate 11, a support superior in conductivity and stability may be used. When the catalyst layer 1 is used as a diffusion layer, a conductive substrate or proton conductive substrate is preferably used and particularly, a conductive porous substrate is preferably used. As the conductive porous substrate, a material formed of a material having air or liquid permeability may be used. For example, porous paper or porous cloth made of a carbon material such as a carbon cloth or carbon paper may be used. Other than the above, a ceramics porous substrate having conductivity, or the like, may be used as the substrate 11.

The deposition of a first material 12 is attained by sputtering using, as the target, a material containing at least one element selected from the group consisting of Pt, Ru, Rh, Os, Ir, Pd, Au, Zr, Ti, Ta, Si, Al, Sn, Hf, Ge, Ga, In, Ce, Nb, W, Mo, Cr, Ni, Co, Mn, Cu, Fe, Zn, B, and V, or by using a film-formation means of depositing the above metal.

The deposition of a second material 13 is attained by sputtering using, as the target, a material containing the second material 13 or by depositing the second material. As the second material 13, an optional material having an optional composition may be used insofar as it can be dissolved by acid washing, alkali washing or the like to remove it in a removing step which will be explained later. For example, a metal or metal oxide may be used as the second material 13. Particularly, the use of a metal is preferable from the viewpoint of process operability and cost because the deposit layer can be formed or removed in a short time. At least one metal selected from the group consisting of Mn, Fe, Co, Ni, Zn, Sn, Al, and Cu is preferably used as the second material 13.

The deposition of the first material 12 and the deposition of the second material 13 may be performed alternately. As shown in FIG. 5, a deposition layer 14 produced by laminating the first material 12 and second material 13 alternately on the substrate 11 can be formed. The number of layers of the first material 12 is preferably 3 to 500 to secure a catalyst amount sufficient for the catalyst layer 1.

FIG. 6 is a sectional view schematically showing a step of heat-treating the deposit layer. The second material 13 can be diffused into the first material 12 as shown in FIG. 6 by carrying out heat treatment of the deposit layer 14 formed in the step of forming the deposit layer. When the first and second materials 12 and 13 each contain a metal, there is the possibility that alloys of these metals are formed by heat treatment.

The temperature of the heat treatment may be designed to be, for example, 300° C. to 600° C. When the heat-treating temperature is designed to be in the above range, the second material 13 can be sufficiently diffused into the first material 12, enabling uniform diffusion. When the heat treatment is performed at a temperature less than 300° C., the diffusion is insufficient, whereas when the heat treatment is performed at a temperature exceeding 600° C., there is the possibility that the deposit layer is peeled from the substrate 11. Further, the heat-treating time is designed to be, for example, 30 min to 2 hr.

The heat treatment may be performed in an atmosphere of inert gas such as argon or oxygen gas atmosphere. When the heat treatment is performed in an oxygen atmosphere, a larger amount of oxides can be formed by the pore 3. Or, the formation of oxides can be limited to the utmost by carrying out heat treatment in a form gas (mixture gas of hydrogen and nitrogen) atmosphere.

Figure 7:
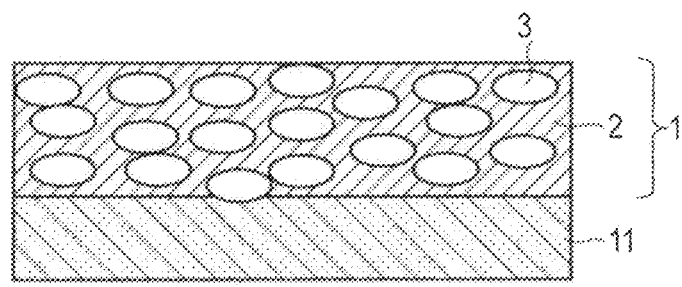
FIG. 7 is a sectional view showing the outline of a step of removing a second material from the deposit layer of a catalyst-supporting substrate according to an embodiment.

FIG. 7 is a sectional view schematically showing a step of removing the second material from the deposit layer. A sponge-like structure provided with a plurality of pores 3 as shown in FIG. 7 can be obtained by removing at least a part of the second material 13 from the heat treated deposit 14.

The removal of the second material 13 can be attained by washing using an acid solution or alkali solution, or by electrolytic method. When performing washing using an acid solution, for example, the heat-treated deposit layer 14 is dipped in nitric acid, hydrochloric acid, sulfuric acid, or a mixture solution of any of these acids for about 5 min to 50 hr to dissolve the second material 13, thereby enabling the second material 13 to flow out of a mixture layer 21. At this time, the deposit layer may be heated to about 50 to 100° C. Further, a bias voltage may be applied to promote the dissolution. Moreover, heat treatment or the like may be performed as after-treatment.

In order to restrain, the outflow of the first material 12 in the removing step, treatment for securing the first material 12 to the substrate 11 may be carried out. For example, the mixture layer 21 may be impregnated with a polymer solution such as Nafion (trademark, Du Pont) prior to the removal. A polymer solution such as Nafion (trademark, Du Pont) may be sprayed or may be impregnated after the removal to promote proton conductivity or to promote the adhesion of the catalyst layer 1 to other materials.

In the production method according to the embodiment, treatment for promoting the existence of an oxide, nitride, or alloy in the pore 3 may be performed. For example, a material which can form an oxide, nitride, or alloy may be used as the first and second materials 12 and 13. For example, an oxide of each of these metals can be made to exist in the state of particles by using a material containing a high-melting point metal such as W and Ta as the second material 13. The deposition may be attained either by simultaneous sputtering or sequential sputtering to form different oxides and/or nitrides. The structure and stability of the oxide can be controlled by introducing oxygen in the atmosphere of this sputtering or vapor deposition method. In this case, it is preferable that the partial pressure in the atmosphere be less than 20%.

Figure 8:
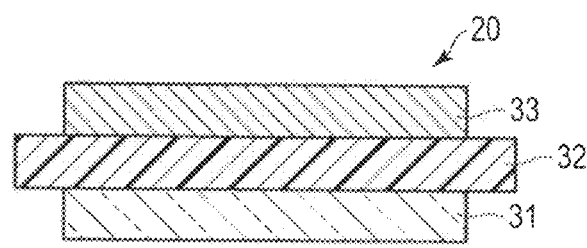
FIG. 8 is a sectional view typically showing a membrane electrode assembly according to an embodiment.
Figure 9:
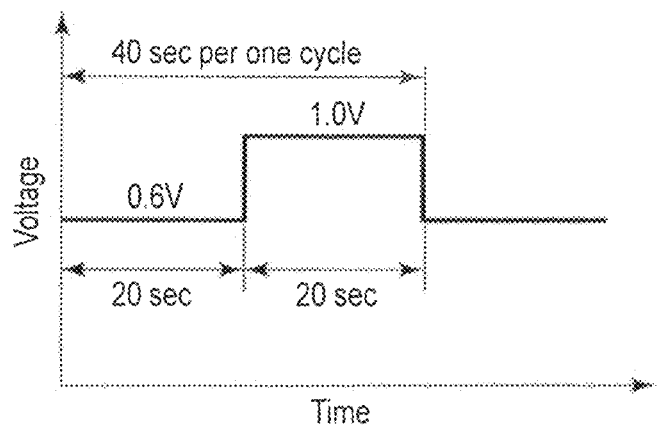
FIG. 9 is a view schematically showing a durability test.

FIG. 8 is a sectional view typically showing a membrane electrode assembly (MEA) 20 according to an embodiment. The membrane electrode assembly according to the embodiment includes a first electrode and a second electrode at least one of which contains the catalyst-supporting substrate according to the embodiment and an electrolyte interposed between the first and second electrodes.

As shown in FIG. 8, the membrane electrode assembly 20 has a structure in which a polymer electrolyte membrane 33 is sandwiched between an anode 31 and a cathode 32. The polymer electrolyte membrane 33 has hydrogen ion conductivity. The anode 31 is constituted of a diffusion layer and an anode catalyst layer laminated on the diffusion layer. Hydrogen is supplied to the anode 31. The cathode 32 is constituted of a diffusion layer and a cathode catalyst layer laminated on the diffusion layer. Oxygen is supplied to the cathode 32. The catalyst layer 1 of the catalyst-supporting substrate is used as at least one of the anode catalyst layer or cathode catalyst layer. On the other hand, the substrate 11 is used as the diffusion layer.

The substrate 11 preferably contains a water-repellent agent. Water repellency is promoted by this agent, and it is therefore possible to prevent the flooding phenomenon that the water created by electric generation is not discharged from the inside of the catalyst layer 1 and water clogging is caused. As the water-repellent agent, for example, a fluorine type polymer material such as a polytetrafluoroethylene (PTFE), polyvinylidene fluoride (PVDF), polyhexafluoropropylene, and tetrafluoroethylene-hexafluoropropylene copolymer (FEP) may be used. The water-repellent agent is introduced into the substrate 11 after the formation of the catalyst layer 1.

The polymer electrolyte membrane 33 contains a proton conductive material. As the proton conductive material, a material capable of conducting protons may be used. For example, fluororesins having a sulfonic acid group such as Nafion (manufactured by Du Pont), Flemion (manufactured by Asahi Kasei Corporation), and "Ashbureck" (manufactured by Asahi Glass Co., Ltd.) and inorganic materials such as tungstic acid and phosphorous-tungstic acid may be used.

The thickness of the polymer electrolyte membrane 33 may be appropriately determined in consideration of the characteristics of the membrane electrode assembly 20. The thickness may be designed to be 5 to 300 μm and preferably 10 μm to 150 μm. Particularly, the thickness of the polymer electrolyte membrane 33 is preferably 5 μm or more from the viewpoint of the strength when the film is formed and durability during operation of the membrane electrode assembly 20, and is preferably 300 μm or less from the viewpoint of the output characteristics of the membrane electrode assembly 20 during operation of the membrane electrode assembly.

The polymer electrolyte membrane 33, the anode 31, and the cathode 33 are bonded with each other by using a device capable of heating and applying pressure. The bonding may be performed by, for example, a hot press. At this time, the temperature of the press may be equal to or more than the glass transition temperature of the polymer electrolyte to be used as a binder for binding the electrode and electrolyte membrane and may be designed to be 100° C. to 400° C., for example. The pressure of the press may be designed to be, for example, 5 kg/cm$^2$ to 200 kg/cm$^2$ though it depends on the hardness of the electrode to be used.

Figure 10:
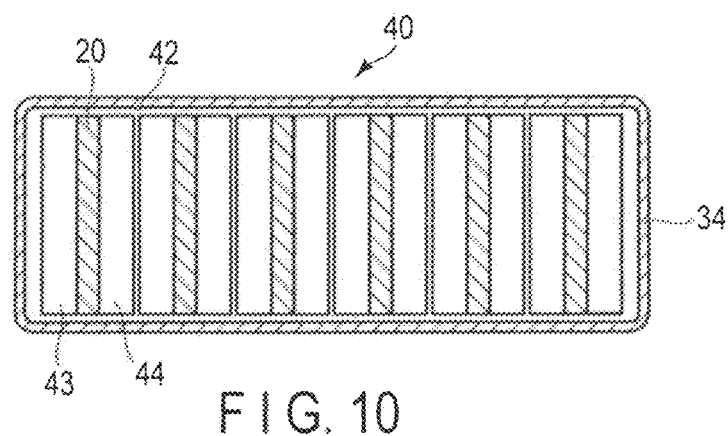
FIG. 10 is a view schematically showing an example of a fuel cell according to an embodiment.

FIG. 10 schematically shows an example of a fuel cell 40 according to an embodiment.

The fuel cell 40 according to this embodiment comprises a membrane electrode assembly 20 according to the embodiment and a casing 34 in which the membrane electrode assembly 20 is accommodated. The casing 34 may include a first separator 43 and a second separator 44 which are disposed opposite to each other with a MEA 20 being sandwiched therebetween. The first and second separators 43 and 44 may be respectively provided with a passage to supply air or fuel to MEA 20. Further, a porous fuel diffusion layer may be disposed between the membrane electrode assembly 20 and a fuel cell passage plate.

A fuel cell 40 is manufactured by laminating unit cells 42 including this MEA 20 and two separators and by connecting these unit cells in series. A higher electromotive force can be obtained by using a plurality of MEAs 20. No particular limitation is imposed on the shape of the fuel cell 40 and the shape of the fuel cell 40 is properly selected corresponding to the characteristics of a battery such as a desired voltage. Here, though the fuel cell 40 is explained on the premise that it has a stuck structure as shown in FIG. 10, it may have, for example, a plane configuration structure.

The shape of the fuel cell may be properly determined so as to obtain desired battery characteristics such as voltage without any particular limitation.

As the fuel to be used, a fuel selected from the group consisting of hydrogen, reformed gas, methanol, ethanol, and formic acid, or an aqueous solution containing one or more fuels selected from the above fuels may be used.

EXAMPLE

Production of Catalyst-supporting Substrates of Examples 1 to 21

Catalyst-supporting substrates according to Examples 1 to 21 were respectively manufactured according to the condition described in the following Table 1. Specifically, these catalyst-supporting substrates were produced in the following manner.

As the substrate, a carbon paper (trade name: Toray 060, manufactured by Toray Industries Inc.) was prepared. This substrate was provided with a carbon layer 5 to 50 μm in thickness on the surface thereof. This substrate was sputtered with a first material having the compositions in each example as shown in Table 1. The surface of the sputtered first material was further sputtered with a second material having the composition shown in Table 1. The sputtering processes using these first and second materials respectively were repeated until the second material reaches the loading amount and the thickness of the catalyst layer shown in Table 1 in each example. In this case, a Pt loading amount of 0.2 mg/cm$^2$ corresponds to an average Pt thickness of about 100 nm. A deposit layer was thus formed on the substrate.

The formed deposit layer was heat-treated at the temperature described for an hour in a nitrogen atmosphere, oxygen atmosphere, or form gas (mixture gas of hydrogen and nitrogen) atmosphere according to the condition shown in Table 1 in each example. The second material is diffused in the first material by this treatment to form a mixture layer.

The formed mixture layer was subjected to acid treatment in which it was dipped in an aqueous 10 wt % sulfuric acid solution kept at 80° C. for 2 hr. Then, the formed mixture layer was washed with pure water and dried to obtain a catalyst-supporting substrate according to each example.

Production of a Catalyst-supporting Substrate of Comparative Example 1

A catalyst-supporting substrate according to Comparative Example 1 was manufactured according to the condition described in the following Table 2. Specifically, a whisker substrate (organic pigment: Pigment Red 149, average diameter: 50 nm) was prepared as the substrate. The whisker substrate was sputtered with platinum. At this time, the loading amount of platinum was set to 0.20 mg/cm$^2$.

Production of Catalyst-supporting Substrates of Comparative Examples 2 to 6

Catalyst-supporting substrates of Comparative Examples 2 to 6 were respectively manufactured according to the condition described in Table 2. A carbon paper (trade name: Toray 060, manufactured by Toray Industries Ltd.) was sputtered with a first material and second material shown in Table 2. These sputtering processes were repeated until the loading amount and the thickness of the catalyst layer reached those shown in Table 1 in each comparative example. Then, in Comparative Example 2, the catalyst layer was subjected to acid treatment in which it was dipped in an aqueous 10 wt % sulfuric acid solution kept at 80° C. for 2 hr. In Comparative Examples 3 to 6, on the other hand, the catalyst layer was subjected to acid treatment in which it was dipped in an aqueous 10 wt % sulfuric acid solution kept at 80° C. for 2 hr after it was heat-treated at the temperature shown in Table 2 in the atmosphere shown in Table 2.

Production of a Catalyst-supporting Substrate of Comparative Example 7

A Pt standard electrode was produced as Comparative Example 7.2 g of a Pt catalyst, 5 g of pure water, 5 g of a 20% Nafion solution (manufactured by Du Pont), and 20 g of 2-ethoxyethanol which were all weighed were sufficiently stirred to disperse, thereby making a slurry. The obtained slurry was applied to a carbon paper (manufactured by Toray Industries, Ltd., 350 μm) which had been subjected to water-repellent treatment by a control coater and then dried. A Pt standard electrode in which the loading density of the Pt catalyst was 0.2 mg/cm$^2$ was thus produced. Although the Pt standard electrode was observed by SEM, any catalyst layer as that of the catalyst-supporting substrate according to the embodiment was not confirmed.

(Observation of the Catalyst Layer)

Each catalyst-supporting substrate produced in Examples 1 to 21 and Comparative Examples 2 to 6 was cut in the thickness direction to observe the section by SEM. As a result, a catalyst layer having pores therein was formed in each of Examples 1 to 21 and Comparative Examples 3 to 6. Moreover, the pore diameter and long-side to short-side ratio of each catalyst-supporting substrate produced in each of Examples 1 to 21, and Comparative Examples 2, 3, 5, and 6 were obtained. In Comparative Example 2, a catalyst layer was formed which had a layer structure of a sheet-like catalyst and a void layer. Further, in Comparative Example 4 in which heat treatment was performed at 700° C., pores in the catalyst layer were collapsed and therefore, the diameter of the pore could not be measured. The results are shown in Tables 1 and 2.

Moreover, the section was observed by TEM and EDX was used to undergo elemental mapping, to confirm whether or not oxides were present in the pores. With regard to Examples 1 to 21 and Comparative Examples 2 to 6, optional 20 pores among pores obtained from each TEM image were analyzed by elemental mapping. The cases where among 20 pores, the number of pores in which an oxide was confirmed to be present was 2 or less, 5 or less, and 6 or more were rated as "Δ", "○", and "⊚" respectively. The results are shown in Tables 1 and 2.

(Production of MEA and Fuel Cell)

Each catalyst-supporting substrate obtained in Examples 1 to 21 and Comparative Examples 1 to 7 was used to produce a membrane electrode assembly (MEA) and a fuel cell. Each catalyst-supporting substrate was cut into a rectangular form (3 cm×4 cm) such that the area of the electrode was about 12 cm$^2$ for use as the cathode. As the anode, on the other hand, the Pt standard electrode of Comparative Example 7 was used. Nafion (trade name, manufactured by Du Pont.) as a polymer electrolyte membrane was sandwiched between these electrodes and the resulting laminate was bonded at 125° C. under a pressure of 30 kg/cm$^2$ for 5 min by thermocompression to produce MEA.

MEA produced in this manner and a passage plate were used to produce a polymer electrolyte fuel cell of a unit cell.

(Measurement of Voltage and Durability)

First, the voltage of each of the produced fuel cell was measured. In each fuel cell, hydrogen was supplied as fuel to the anode at a flow rate of 20 ml/m and air was supplied to the cathode at a flow rate of 100 ml/min. The fuel cell was made to discharge at a current density of 0.2 A/cm$^2$ while keeping the fuel cell at 65° C. to measure cell voltage (V) after 10 hr. The results are shown in Tables 1 and 2.

Next, a durability test was made. In each fuel cell, hydrogen was supplied as fuel to the anode at a flow rate of 40 ml/min and nitrogen was supplied to the cathode at a flow rate of 40 ml/min. A potential cycle comprising (1) a step of maintaining a voltage of 0.6 V for 20 sec and (2) a step of maintaining a voltage of 1.0 V for 20 sec was repeated 10000 times. The outline of this cycle is shown in FIG. 8. In this case, the 0.6 V section is assumed to be the state where the battery is stopped, and the 1.0 V section is assumed to be the state where the battery is operated. The voltage of the battery measured after 10000 cycles was compared with the voltage obtained after 10 hr to measure durability: the durability was rated as "⊚" when the reduction in the ratio of the voltage measured after 10000 cycles to that measured after 10 hr was 10% or less, as "○" when the reduction in the ratio of the voltage measured after 10000 cycles to that measured after 10 hr exceeded 10% and less than 25%, and as "Δ" when the reduction in the ratio of the voltage measured after 10000 cycles to that measured after 10 hr was 25% or more. The results are shown in Tables 1 and 2.

TABLE 1

| | Catalyst (first material) | | | | Heat | Atmosphere in heat treatment |
|---|---|---|---|---|---|---|
| | Composition | Loading amount (mg/cm$^2$) | Thickness (μm) | Second material Composition | treating temperature (° C.) | N: Nitrogen gas O: Oxygen gas F: Form gas |
| Example 1 | Pt | 0.2 | 0.8 | Al | 300 | N |
| Example 2 | Pt | 0.2 | 0.8 | Al | 300 | O |
| Example 3 | Pt | 0.2 | 0.9 | Al | 400 | N |
| Example 4 | Pt | 0.2 | 1.2 | Al | 600 | N |
| Example 5 | Pt | 0.05 | 0.2 | Al | 400 | N |
| Example 6 | Pt | 0.03 | 0.1 | Al | 400 | N |
| Example 7 | Pt | 0.2 | 1.1 | Fe•Al | 450 | N |
| Example 8 | Pt | 0.2 | 1.0 | Al | 400 | O |
| Example 9 | Pt•Al | 0.2 | 0.85 | Al | 450 | O |
| Example 10 | Pt | 0.2 | 1.1 | Al | 400 | F |
| Example 11 | Pt•W•Mo | 0.2 | 1.3 | Fe | 550 | N |
| Example 12 | Pt3•Co | 0.2 | 1.1 | Al | 400 | O |
| Example 13 | Pt•Co•Ni | 0.2 | 1.2 | Al | 400 | O |
| Example 14 | Pt3•Nb | 0.2 | 1.3 | Cu | 350 | N |
| Example 15 | Pt•Ta•W | 0.2 | 1.3 | Fe | 500 | N |
| Example 16 | Pt3•Ni•Si | 0.2 | 1.1 | Mn | 500 | F |
| Example 17 | Pt3•Hf•Ta | 0.2 | 1.2 | Ni•Al | 400 | N |
| Example 18 | Pt2•Ru | 0.2 | 1.1 | Sn | 350 | N |
| Example 19 | Pt3•Co | 0.2 | 1.1 | Mn | 400 | O |
| Example 20 | Pt2•V | 0.2 | 1.2 | Fe•Al | 550 | F |
| Example 21 | Pt2•Ni | 0.2 | 1.3 | Zn | 500 | O |

| | Average diameter of pores (nm) | Ratio of long-side/short-side | Oxides present in pores | Voltage (V) | Durability |
|---|---|---|---|---|---|
| Example 1 | 150 | 8:1 | ○ | 0.75 | ○ |
| Example 2 | 150 | 8:1 | ⊚ | 0.76 | ⊚ |
| Example 3 | 100 | 7:1 | ○ | 0.76 | ⊚ |
| Example 4 | 80 | 3:1 | ○ | 0.76 | ⊚ |
| Example 5 | 60 | 6:1 | ○ | 0.7 | ○ |
| Example 6 | 40 | 6:1 | ○ | 0.67 | ○ |
| Example 7 | 80 | 6:1 | ○ | 0.75 | ⊚ |
| Example 8 | 100 | 7:1 | ⊚ | 0.77 | ⊚ |
| Example 9 | 100 | 4:1 | ⊚ | 0.76 | ⊚ |
| Example 10 | 90 | 6:1 | Δ | 0.74 | ○ |
| Example 11 | 85 | 5:1 | ○ | 0.76 | ○ |
| Example 12 | 110 | 5:1 | ⊚ | 0.78 | ⊚ |
| Example 13 | 105 | 4:1 | ⊚ | 0.78 | ⊚ |
| Example 14 | 135 | 6:1 | ○ | 0.76 | ○ |

TABLE 1-continued

| | | | | | | |
|---|---|---|---|---|---|---|
| Example 15 | 95 | 5:1 | ○ | 0.75 | ○ |
| Example 16 | 90 | 5:1 | Δ | 0.74 | ○ |
| Example 17 | 100 | 5:1 | ○ | 0.76 | ○ |
| Example 18 | 110 | 4:1 | ○ | 0.75 | ○ |
| Example 19 | 110 | 6:1 | ◎ | 0.78 | ◎ |
| Example 20 | 95 | 5:1 | Δ | 0.74 | ○ |
| Example 21 | 95 | 6:1 | ◎ | 0.76 | ○ |

TABLE 2

| | Catalyst (first material) | | | Heat | |
|---|---|---|---|---|---|
| | Composition | Loading amount (mg/cm$^2$) | Thickness (μm) | Second material Composition | treating temperature (° C.) | Atmosphere in heat treatment N: Nitrogen gas |
| Comparative Example 1 | Pt | 0.2 | 10 | — | — | — |
| Comparative Example 2 | Pt | 0.2 | 1.2 | Al | — | — |
| Comparative Example 3 | Pt | 0.2 | 0.9 | Al | 200 | N |
| Comparative Example 4 | Pt | 0.2 | 0.7 | Al | 700 | N |
| Comparative Example 5 | Pt | 0.01 | 0.04 | Al | 400 | N |
| Comparative Example 6 | Pt | 0.8 | 3.2 | Al | 400 | N |
| Comparative Example 7 | Standard electrode | 0.2 | 20 | — | — | — |

| | Average diameter of pores (nm) | Ratio of long-side/short-side | Oxides present in pores | Voltage (V) | Durability |
|---|---|---|---|---|---|
| Comparative Example 1 | — | — | — | 0.70 | ○ |
| Comparative Example 2 | 450 | 20:1 | Δ | 0.72 | ○ |
| Comparative Example 3 | 250 | | ○ | 0.72 | ○ |
| Comparative Example 4 | — | — | ○ | 0.72 | Δ |
| Comparative Example 5 | 35 | 15:1 | ○ | 0.65 | ○ |
| Comparative Example 6 | 120 | 8:1 | ○ | 0.73 | ○ |
| Comparative Example 7 | — | — | — | 0.70 | Δ |

(Evaluation)

It is found from Tables 1 and 2 that when comparing Examples 1 to 4, and 7 to 21 which are equal in loading amount with Comparative Examples 1 to 4 and 7, each of Examples 1 to 4 and 7 to 21 exhibits a high voltage and durability and therefore has high performance as a fuel cell.

It is found from the comparison between Examples 1, 3 and 4 with Comparative Examples 3 and 4 that the optimum temperature of the heat treatment is 300° C. to 600° C., and more preferably 400° C. to 600° C.

It is found from the comparison between Examples 1 and 2, and between Examples 3, 8, and 10 that much oxides present in pores by carrying out heat-treatment in an oxygen atmosphere and it is also indicated that the voltage is improved corresponding to this presence of much oxides.

It is found from the comparison between Example 8 and Examples 12, 13, or 19 that the voltage is improved by using a multicomponent alloy containing platinum and metals other than platinum as the first material.

It is found from Examples 5 and 6 that even in the case where the loading amount is low, a high voltage and durability are exhibited, showing that Examples 5 and 6 have a high performance as a fuel cell.

Comparative Example 5 fails to obtain a high voltage.

Although it seems that Comparative Example 6 obtains a high voltage and durability, the loading amount is high, and it is also necessary to increase the thickness. This shows that Comparative Example 6 fails to obtain high catalyst activity. Further, gas is insufficiently diffused because of high thickness, and therefore, the voltage is not improved in spite of a high loading amount.

From the above results, it is confirmed that the characteristics of a fuel battery are improved by carrying out heat treatment to form a plurality of holes in the catalyst layer and it is also confirmed that the catalyst activity is more improved and cycle characteristic are therefore more improved by making oxides exist in the pores.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A catalyst-supporting substrate, comprising:

a substrate; and a catalyst layer which is supported by the substrate and which comprises a plurality of pores, wherein, in a section of the catalyst layer cut in a thickness direction, a section is observed by using a scanning electron microscope to obtain a sectional photograph, and five pores with boundaries being closed between the pore and the catalyst on the sectional photograph are selected, the pores have an average diameter of 5 nm to 400 nm and long-side to short-side ratios of 1:1 to 10:1 in average on the section in the thickness direction of the catalyst layer, and a ratio of the average diameter of the five pores to the thickness of the catalyst layer ranges from 85/1300 to 40/100, and wherein the catalyst layer comprises a single metal of an element selected from the group consisting of Pt, Ru, Rh, Os, Ir, Pd, Au, Zr, Ti, Ta, Si, Al, Sn, Hf, Ge, Ga, In, Ce, Nb, W, Mo, Cr, Ni, Co, Mn, Cu, Fe, Zn, B, and V, an alloy constituted of two or more of these elements, or an oxide containing at least one of these elements, and the entire catalyst layer comprises no carbon.

2. The catalyst-supporting substrate according to claim 1, wherein the catalyst layer has an average thickness of 0.05 µm to 3 µm.

3. The catalyst-supporting substrate according to claim 1, wherein a single metal of at least one element selected from the group consisting of Ni, Mn, Sn, Al, Cu, Fe, and Zn, an alloy constituted of two or more of these elements, an oxide containing at least one of these elements, or a nitride containing at least one of these elements is present inside the pores.

4. The catalyst-supporting substrate according to claim 1, wherein the long-side and the short-side are defined such that as follows:

in the section of the catalyst layer cut in a thickness direction, the catalyst layer is cut in a thickness direction to obtain a sectional photograph;

a smallest circle which comes into contact with a contour of the pore at two points is drawn and a straight line L running through two contact points is drawn, or a smallest circle which comes into contact with a contour of the pore at three or more points is drawn and distances between all contact points are measured and a pair of contact points most distant from each other is selected and a straight line L is drawn running through these points;

among lines parallel to the straight line L, two straight lines M and N each of which runs on the contour of the pore and does not cross a region enclosed by the contour are drawn;

then, where the long-side is defined as a distance between the two contact points on the straight line L, and the short-side is defined as a distance between the straight lines M and N.

5. The catalyst-supporting substrate according to claim 1, wherein the catalyst-supporting substrate is made by a method that comprises:

repeatedly simultaneously or alternately performing sputtering or vapor deposition of a first material having catalyst activity and sputtering or vapor deposition of a second material which is dissolved more easily than the first material in a dissolution treatment using an acid solution, an alkali solution or an electrolytic method, on the substrate to form a deposit layer including the first and second materials;

performing heat treatment of the deposit layer to diffuse the second material into the first material and form a heat-treated deposit layer; and removing at least a part of the second material from the heat-treated deposit layer by dissolution treatment to obtain said catalyst layer comprising the plurality of pores.

* * * * *